United States Patent [19]

Corrigan

[11] Patent Number: 4,853,902
[45] Date of Patent: Aug. 1, 1989

[54] PREDICTIVE NOISE FILTERING OF MULTI-COMPONENT SEISMIC DATA

[75] Inventor: Dennis Corrigan, Plano, Tex.

[73] Assignee: Atlantic Richfield Company, Los Angeles, Calif.

[21] Appl. No.: 164,977

[22] Filed: Mar. 7, 1988

[51] Int. Cl.$^4$ .............................................. G01V 1/36
[52] U.S. Cl. ....................... 367/44; 367/38; 367/43; 367/59
[58] Field of Search ................. 367/38, 43, 44, 56, 367/59

[56] References Cited

U.S. PATENT DOCUMENTS 3,397,754  8/1968  Roden .................................... 367/43
4,757,480  7/1988  Gutowski .............................. 367/44

OTHER PUBLICATIONS

"Motion Product Seismograms," J. E. White, Geophysics, vol. 24, #2 (Apr. 1964), pp. 288–298.

Primary Examiner—Thomas H. Tarcza
Assistant Examiner—Ian J. Lobo
Attorney, Agent, or Firm—James C. Fails

[57] ABSTRACT

An improvement in a method of treating seismic data in which predictive noise, as measured along one of the axes is discriminated and subtracted from the total signal along another of the axes recorded by geophone recording the reflection from subterranean strata of energy input from a source at the surface.

13 Claims, 2 Drawing Sheets

PREDICTIVE NOISE FILTERING OF MULTI-COMPONENT SEISMIC DATA

FIELD OF THE INVENTION

This invention relates to processing of geophysical data to improve the signal-to-noise ratio.

More particularly, this invention relates to predictive noise filtering of multi-component seismic data by subtracting predictive noise from the signal to enhance the signal-to-noise ratio and obtain a more desirable signal portion from the recorded signal.

BACKGROUND OF THE INVENTION

In seismic exploration, it is well recognized that geophysical data is obtained by applying acoustic energy to the earth at the surface and detecting seismic energy reflected from reflecting interfaces of the subsurface formations. Unfortunately the data often contains noise that tends to obscure the signal or desired information that will help to pick out these interfaces of subterranean strata, among other desirable information.

The prior art has seen a wide variety of different approaches to employing theoretical equations to improve the signal-to-noise ratio. Illustrative of these type patents are the following:

U.S. Pat. No. 3,581,274; "Frequency-Domain Band Broadening of Seismic Data"; William H. Ruehle; U.S. Pat. No. 3,611,278; "Interval Velocity Determination"; Norman J. Guinzy and William H. Ruehle; and U.S. Pat. No. 3,622,967; "Optimum Stack"; Manus R. Foster and Raymond L. Sengbush. A plurality of references have been cited against these patents, also, but these type patents illustrate the use of theoretical equations for improving signal to noise ratio of recorded seismic data.

Exploration seismic data often is dominated by source generated energy whose propagation is confined to the near surface layers of the earth. This represents a form of coherent noise which can obscure reflections from deeper layers of interest to the explorationist. In conventional, single component seismology this coherent noise is suppressed through a variety of techniques including appropriate source and receiver arrays, low cut filters and spatial (f-k) filters.

The collection of multi-component data involves the recording of more than one source component and/or more than one receiver component for each source/receiver configuration in a survey. The additional components may provide supplementary information about the deep subsurface which can be of significant interest to the explorationist. A new application for these multi-component surveys is the reduction of coherent noise which may be afforded by an appropriate combination of different components.

SUMMARY OF THE INVENTION

This invention can lead to a significant improvement in the quality of multi-component seismic data by improving the signal-to-noise ratio; and, hence, improving the interpretability of the data to the explorationist.

In particular, this invention can avoid use of spatial and temporal filters which limit the resolution of conventional subsurface images, yet still improve the signal-to-noise ratio by subtracting out predictive noise as determined by one component that is recorded such that the second component that is so corrected has a better quality signal.

These and other objects will become apparent from the descriptive matter hereinafter, particularly when taken in conjunction with the appended drawings.

In accordance with this invention, there is provided an improvement in a method of treating seismic data in which source energy is input at the surface of the earth and a plurality of records are made of the reflection of the source energy from the subterranean strata in what is referred to as multi-component recording. The improvement is characterized by recording the recorded reflection with a plurality of at least two components along the respective x-, y-, and z-axes; discriminating from one of the recorded reflections components a predictive noise portion; and subtracting the predictive noise portion from the second said recorded reflections to thereby more clearly delineate a desired signal portion. Preferably the multi-components are recorded along at least the x- and z-orthogonal axes.

BRIEF DESCRIPTIONS OF THE DRAWINGS

DESCRIPTION OF PREFERRED EMBODIMENT(S)

Figure 1:
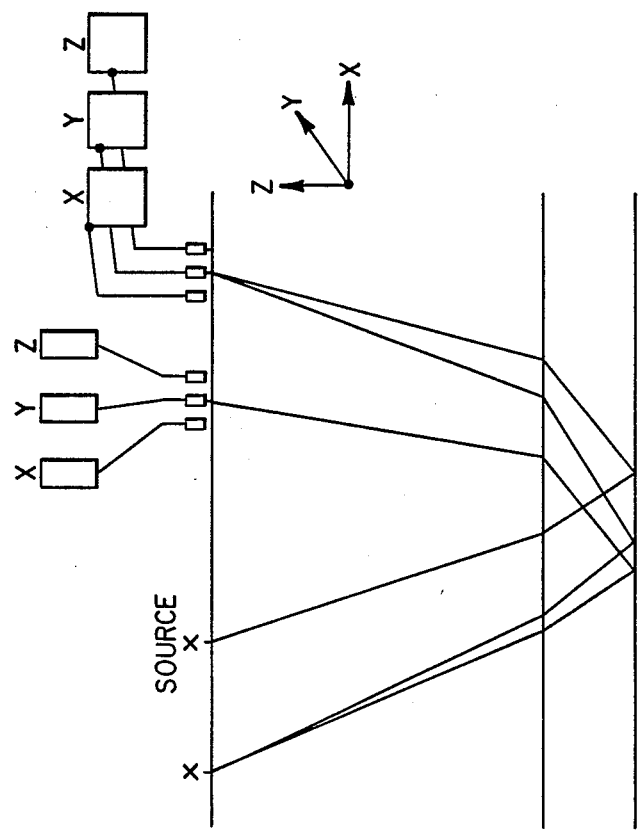
FIG. 1 is a schematic view showing a ray path of seismic energy from a source at the surface to reflective strata of subterranean formations and back to the surface geophones where the traces are recorded.

As is well recognized in seismic exploration acoustic energy is generated and applied to the surface of the earth at one or more locations indicated by the sources in FIG. 1. Similarly, reflected signals, as the seismic energy reflected from subterranean strata, are recorded at one or more geophones at one or more locations as can be seen in FIG. 1. In FIG. 1 the ray paths are indicated from the source to the geophone. It is convenient to discuss a first input signal component as A and a second input signal component from the same or different source as B. In this instance we shall be referring to two signal components input from the same source as A and B.

In most multi-component recordings for the signals, the following assumptions may be made: (1) Each component contains independent information about the deep subsurface of interest in exploration. This makes it necessary and advisable to record multiple components such as along the x-, y- and z-orthogonal axes, as superimposed onto FIG. 1. (2) The coherent noise due to elastic waves propagating in the near surface layer is correlated from component-to-component. Under these conditions, the unwanted coherent noise may be distinguished from the reflection signal of interest by being predictable from one component to another.

It is this observation on which this invention is based and can be broadly spoken of as, for a given component, indentifying and removing those portions which are predictable from other components.

Thus, the invention can be understood from considering a fundamental mathematical model which underlies the proposed method of noise suppression by subtracting out the predicted component portion, such as coherent predictable noise.

Consider for a moment recording two different receiver components such as along the x- and y-axis by reflected energy received from a common source. This could just as easily be two different sources recorded by a common receiver as long as they were over the same surface or near surface terrain. If we call these recordings A(x,t) and B(x,t), where x is the source to receiver distance and t is the recording time the equations of (1) and (2) follow:

$$x_n = n\Delta x, \tag{1}$$

$$t_i = i\Delta t, \tag{2}$$

where $\Delta x$ is the group interval and $\Delta t$ is the temporal sample rate.

By use of standard signal processing techniques, A(x,t) and B(x,t) may be transformed into the frequency domain, resulting in new (equivalent) functions of equation (3)

$$A_n(w) \text{ and } B_n(w). \tag{3}$$

with w = the frequency.

At this point, assume the generally recognized fact that the total recording is composed of the signal portions of the component and the noise portions of the component as set forth in equations (4) and (5) as follows:

$$A_n(w) = S_n^A(w) + N_n^A(w) \tag{4}$$

$$B_n(w) = S_n^B(w) + N_n^B(w) \tag{5}$$

Here S designates the sought-after signal contained on each component recorded and N designates the unwanted noise contained on each component. Further assumptions can be made as follows:

(1) The signals $S^A$ and $S^B$ are not related to each other; that is, they contain independent information.

(2) The noises in $N^A$ and $N^B$ are related to each other; that is, they are not independent.

Given these assumptions, which are factual, it is clear that the joint use of A and B can help in the identification of the interdependent noise components. Heuristically, empirical evidence demonstrates that the part of A which is predictable from B should consist of the noise field $N^A$ and the part of B which is predictable from A should be $N^B$. These words are implemented mathematically by the following:

Spatial filters $g_m(w)$ which predict, say, $B_n(w)$ from $A_n(w)$ are shown by the following equation (6).

$$\hat{B}_n(w) = \sum_m g_m(w) A_{n-m}(w) \tag{6}$$

If the frequency dependence is suppressed, since each w is treated separately, the residual (unpredictable) energy remaining in B is $$J = \sum_n [B_n - \hat{B}_n]^2. \tag{7}$$

If J be minimized with respect to $g_m$ we obtain in a standard way equations which define these filters. Then, the following equation (8) defines the noise component and equation (9) defines the estimated signal component.

$$N_n^B = \sum_m g_m A_{n-m} \tag{8}$$

$$S_n^B = B_n - N_n^B \tag{9}$$

It will be readily apparent that these sets of equations are reversible between A and B such that A and B components can be interchanged to identify and suppress the noise on the A component if desired.

Figure 2:
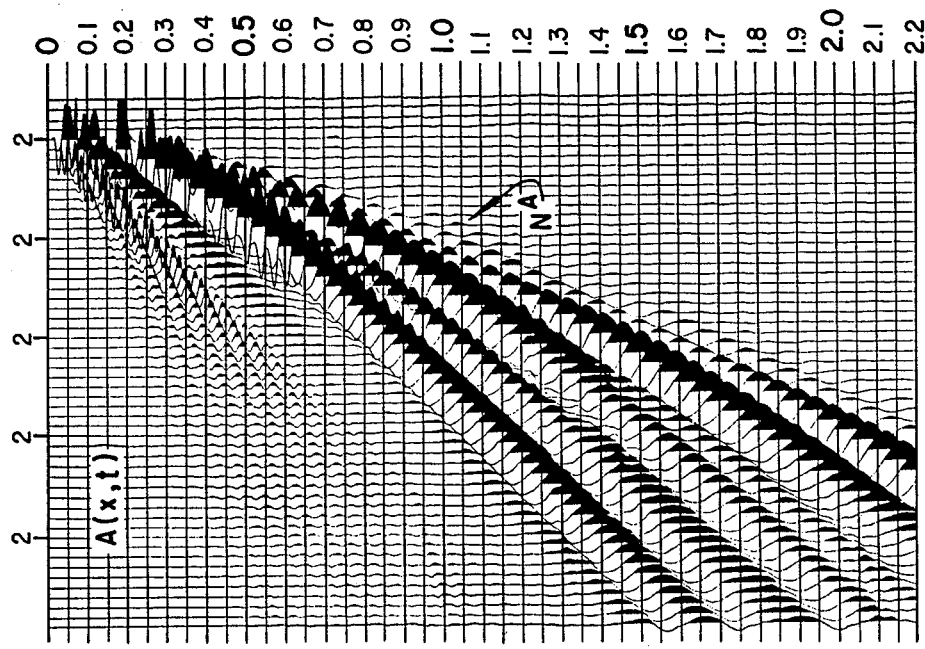
FIG. 2 shows an A-component seismogram, $A(x,t)$, with the unwanted noise labeled $N^A$.
Figure 4:
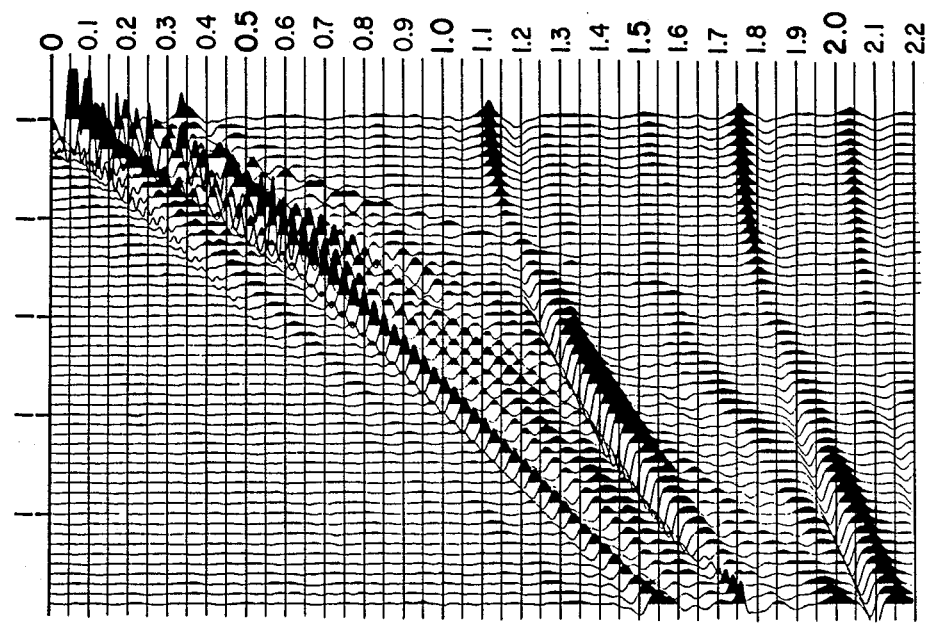
FIG. 4 shows the B-component after predictive filtering with the residual noise labeled $N^B$ and showing the clearly enhanced signal labeled $S^B$.
Figure 3:
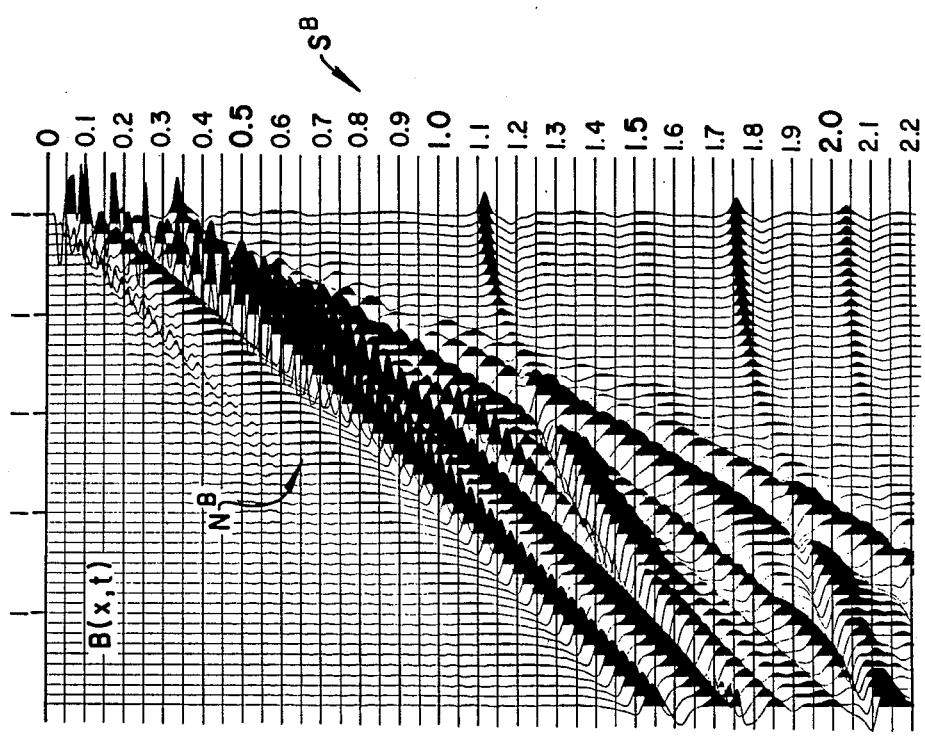
FIG. 3 is the B-component seismogram, $B(x,t)$, with the desired signal labeled $S^B$ and the unwanted noise labeled $N^B$.

Referring to FIGS. 2–4, FIG. 2 illustrates the seismogram A(x,t) of the A component with the unwanted noise labeled $N^A$.

FIG. 3 illustrates the B component seismogram, B (x,t) with the desired signal labeled $S^B$ and the unwanted noise labeled $N^B$.

If the unwanted noise $N^B$ predicted from A of FIG. 2 is substracted, the result is illustrated in FIG. 4 wherein the desired signal $S^B$ is enhanced. Thus, comparison of FIGS. 3 and 4 show that the predictive filtering has enhanced the signal labeled $S^B$. Expressed otherwise, the reflection signals of interest show up more clearly in FIG. 4.

While this invention has been described with respect to recording two components along respectively, the x-z orthogonal axes, it is readily apparent that it could be employed with other planes in the orthogonal series with equally good results. Moreover, it is equally apparent that, instead of employing dual components from a single source, information from multiple sources could be employed as illustrated in FIG. 1 as long as there was common terrain, or surface layers, between the sources and the geophones.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a method of treating seismic data which:
   a. source energy is input at the surface of the earth;
   b. a plurality of reflection records are made of the reflection of said source energy from subterranean strata; the improvement comprising:
   c. recording each of said reflection records with at least two components along respective orthogonal axes, said two components being first and second components;
   d. discriminating from each of said respective first and second reflection record components a noise portion, for each reflection record said respective noise portion of said respective first component being discriminated by filtering said respective second component with a spatial filter, said spatial filter being determined from a correlation of all of said first and second components, for each reflection record said respective noise portion of said respective second component being discriminated by filtering said respective first component with said spatial filter; and
   e. subtracting said respective noise portions from said respective reflection records to thereby more clearly delineate a desired signal portion.

2. A method for reducing coherent noise in seismic signals, comprising the steps of:
   a. providing a source means and a plural receiver means adjacent to the earth, said plural receiver means being separated from said source means, each of said receiver means being capable of measuring first and second components of seismic activity;
   b. operating said source means so as to produce a seismic energy;
   c. measuring said seismic energy with said plural receiver means such that each of said receiver means produces respective first and second seismic signals corresponding to said measured first and second seismic components, each of said first and second seismic signals having a respective noise portion;
   d. determining a spatial filter from said plural first seismic signals and said plural second seismic signals, said spatial filter being derived from a correlation of said plural first seismic signals and said plural second seismic signals;
   e. for each receiver means determining the noise portion of said respective first seismic signal from said spatial filter and said respective second seismic signal, and determining the noise portion of said respective second seismic signal from said spatial filter and said respective first seismic signal;
   f. removing said respective determined noise portions from said respective first and second seismic signals to obtain first and second seismic signals with reduced noise.

3. The method of claim 2 wherein said respective first and second components are orthogonal.

4. The method of claim 3 wherein said respective first components correspond to vertical components and said respective second components correspond to horizontal components.

5. The method of claim 4 wherein said respective receiver means are separated from one another by equal distances.

6. The method of claim 2 wherein said respective receiver means are separated from one another by equal distances.

7. The method of claim 2 wherein said spatial filter is a frequency domain filter such that said determinations of noise portions are in the frequency domain.

8. The method of claim 7 wherein said respective first and second components are orthogonal.

9. The method of claim 8 wherein said respective first components correspond to vertical components and said respective second components correspond to horizontal components.

10. The method of claim 9 wherein said respective receiver means are separated from one another by equal distances.

11. The method of claim 7 wherein said respective receiver means are separated from one another by equal distances.

12. A method for reducing noise in seismic signals, comprising the steps of:
    a. providing plural seismic signals, said seismic signals having noise which is coherent between said seismic signals, each of said seismic signals having a first component and a second component, each of said first and second seismic components having a respective noise portion;
    b. determining a spatial filter from said plural first seismic components and said plural second seismic components, said spatial filter being derived from a correlation of said plural first seismic components and said plural second seismic components;
    c. for each seismic signal determining the noise portion of said respective first seismic component from said spatial filter and said respective second seismic component, and determining the noise portion of said respective second seismic component from said spatial filter and said respective first seismic component;
    d. removing said respective noise portions from said respective first and second seismic components to obtain seismic signals with reduced noise.

13. A method of reducing noise in seismic signals, comprising the steps of:
    a. providing plural seismic signals obtained from plural receiver means, said plural receiver means for receiving seismic energy, said plural receiver means separated from each other by predetermined distances, each of said seismic signals having first and second components, each of said first and second components having a respective noise portion, said noise portions being coherent between said seismic signals;
    b. determining the respective frequency content of each of said first and second seismic components;
    c. for each frequency determining a spatial filter from said first and second seismic components, said spatial filter being derived from a correlation of said first seismic components and said second seismic components;
    d. for each frequency of each receiver means determining the noise portion of said respective first seismic component from said spatial filter and said respective second seismic component, and determining the noise portion of said respective second seismic component from said spatial filter and said respective first seismic component;
    e. removing said respective determined noise portions from said respective first and second seismic components in order to obtain first and second seismic components with reduced noise.

* * * * *